(12) United States Patent
Benda

(10) Patent No.: US 7,543,604 B2
(45) Date of Patent: Jun. 9, 2009

(54) CONTROL VALVE

(75) Inventor: Jiri Benda, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 243 days.

(21) Appl. No.: 11/530,646

(22) Filed: Sep. 11, 2006

(65) Prior Publication Data

US 2008/0060708 A1    Mar. 13, 2008

(51) Int. Cl.
*F16K 1/44* (2006.01)
(52) U.S. Cl. .................... 137/625.33; 251/212
(58) Field of Classification Search ............ 137/601.19, 137/613, 614.19, 625.33, 625.34, 625.39, 137/629, 630.19, 637.2; 251/210, 211, 212
See application file for complete search history.

(56) References Cited

U.S. PATENT DOCUMENTS 1,033,204 A * 7/1912 Skinner ................. 137/625.34
1,165,315 A * 12/1915 Cameron ............... 137/625.34
1,206,532 A * 11/1916 Gray ........................... 417/252
4,114,652 A * 9/1978 Oberle .................. 137/630.14
4,481,776 A * 11/1984 Araki et al. .................... 60/660
6,655,409 B1 * 12/2003 Steenburgh et al. .... 137/614.19
7,000,635 B2 * 2/2006 Erbe et al. ............. 137/625.36

* cited by examiner

*Primary Examiner*—John Fox

(57) ABSTRACT

A gas valve may include a valve body defining an upper valve seat region, and in some cases a lower valve seat region. A main valve that includes an upper main plate, and in some cases a lower main plate, may be disposed within the valve body. A control valve that includes an upper control plate, and in some cases, a lower control plate may be coaxially aligned with the main valve. The main valve may provide shut-off functionality while the control valve may provide flow control.

10 Claims, 4 Drawing Sheets

CONTROL VALVE

TECHNICAL FIELD

The present disclosure pertains generally to gas valves, and more particularly to modulating gas valves.

BACKGROUND

A number of gas-fed appliances are known. A gas-fed appliance typically employs a gas valve to control the flow of gas to a burner in which the gas is burned to produce heat. In many cases, a gas valve either permits gas to flow or ceases gas flow in response to a control signal from a control device such as a thermostat or other controller. A need remains for improved gas valves.

SUMMARY

The present invention relates to an improved gas valve. In one illustrative embodiment, the gas valve includes a valve body that defines a valve seat region. A main gas valve is disposed within the valve body and is adapted to open and close relative to the valve seat region. A control valve, sometimes coaxially aligned with the main valve, may also be adapted to open and close relative to the valve seat region. In some cases, the main valve may be used to open the gas valve subject to the position of the control valve. With the main valve in the open position, the position of the control valve may be modulated to provide flow control through the gas valve. The control valve may be lighter in weight than the main valve, and thus in some cases may be more easily moved, which can help increase the response time of the gas valve, and which in some cases may permit finer pressure control.

Another illustrative embodiment may be found in a gas valve that includes a valve body defining an upper valve seat region and a lower valve seat region. A main valve that includes an upper main plate and a lower main plate may be disposed within the valve body. A control valve that includes an upper control plate and a lower control plate may be coaxially aligned with the main valve.

In some instances, the upper valve seat region may be configured to accommodate the upper main plate and the upper control plate. The lower valve seat region may be configured to accommodate the lower main plate and the lower control plate. In some cases, the upper valve seat region may include an upper main valve seat that is adapted to interact with the upper main plate and an upper control valve seat that is adapted to interact with the upper control plate. The lower valve seat region may, if desired, include a lower main valve seat that is adapted to interact with the lower main plate and a lower control valve seat that is adapted to interact with the lower control plate.

The main valve and the control valve may, in some circumstances, be independently actuatable. In some instances, the main valve may be adapted to override and close the control valve, but this is not required in all embodiments. The main valve may be considered in some embodiments as providing shut-off functionality, while the control valve may be considered as providing flow control or modulating functionality. M,.

In some instances, the main valve may include a hollow main valve shaft and the control valve may include a control valve shaft that is slidingly disposed within the hollow main valve shaft. In some cases, the control valve may include a sealing ring that is disposed on the lower control plate and that interacts with the main valve to stop gas flow through the main valve hollow shaft. In other instances, the control valve may include a hollow control valve shaft and the main valve may include a main valve shaft that is slidingly disposed within the hollow control valve shaft.

Another example embodiment may be found in a gas valve that includes a valve body that defines a valve seat. A main valve may be disposed within the valve body and a control valve may be coaxially aligned with the main valve. The main valve may be adapted to override the control valve. In some instances, the main valve and the control valve may be independently actuated. The main valve may, if desired, include a main plunger that is mounted on a hollow main shaft. The control valve may, if desired, include a control plate that is mounted on a control shaft. The control shaft may extend into the hollow main shaft. The control plate may be disposed between the main plunger and the valve seat. In some cases, the valve seat may include a first mating surface that is adapted to contact the main plunger and a second mating surface that is adapted to contact the control plate.

Another example embodiment may be found in a balanced port gas valve that includes a valve body. A dual shut-off valve may be disposed within the valve body. A dual control valve may be coaxially aligned with the dual shut-off valve. In some instances, the dual shut-off valve may include a main shaft and a main plunger that is secured to the main shaft. The main plunger may provide first and second main plates that are adapted to interact with the valve body and thereby permit or stop gas flow. The dual control valve may, in some instances, include a control shaft and first and second control plates that are secured to the control shaft. The first and second control plates may be adapted to interact with the valve body to adjust gas flow. In some cases, the main shaft and the control shaft may be actuated from opposing directions.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
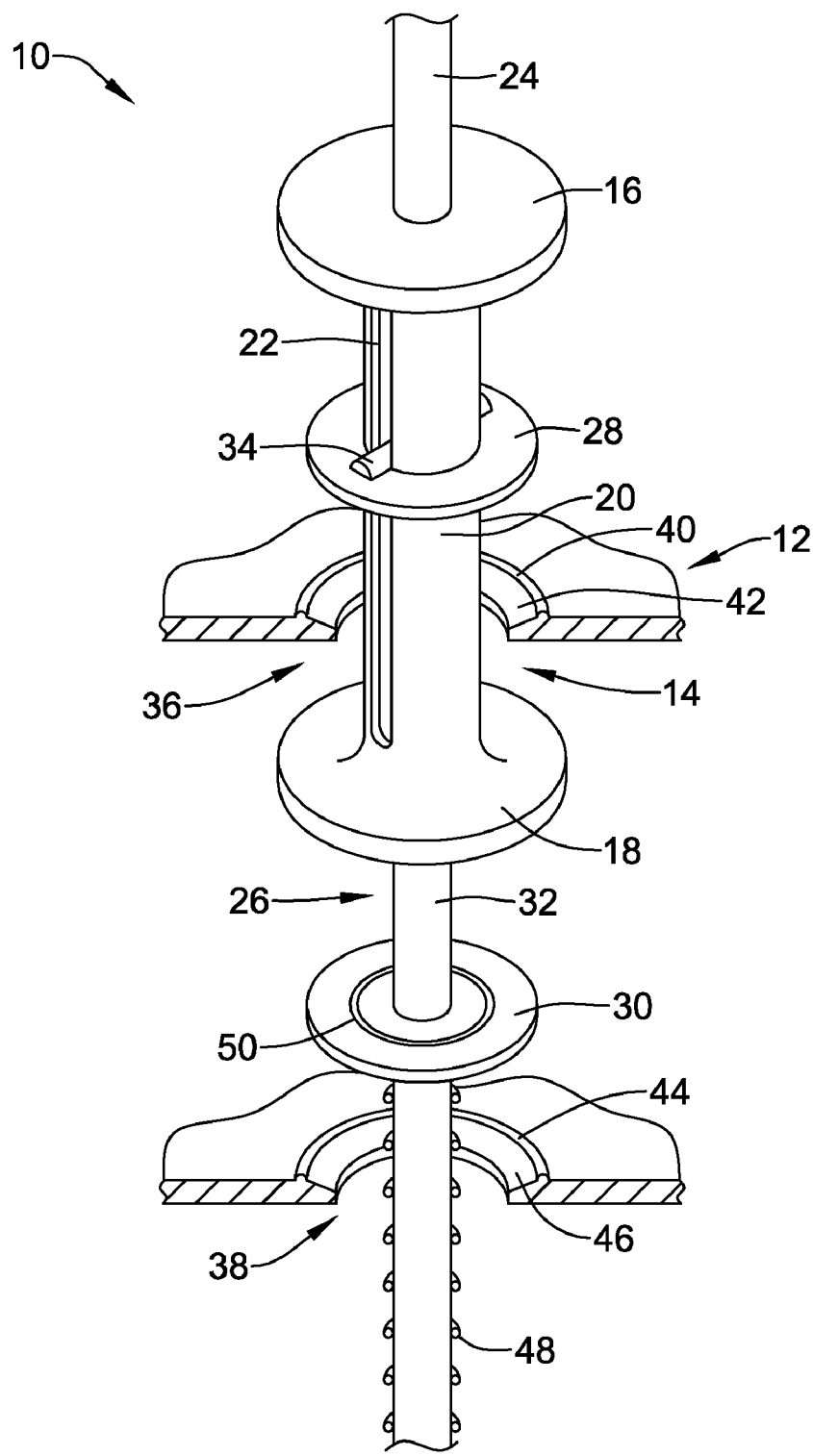
FIG. 1 is a perspective view of a portion of a gas valve in accordance with an illustrative embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 is a partial cross-sectional view of a portion of a gas valve 10 in accordance with an illustrative embodiment of the present invention. The illustrative gas valve 10 includes a valve body 12. Valve body 12 may be formed of any suitable material, using any suitable technique. In some instances, valve body 12 may be cast or molded from any suitable metal, plastic, rubber, ceramic, or any other material combination, as desired.

In the illustrative embodiment, a main valve 14 is movably disposed within valve body 12. Main valve 14 includes an upper main plate 16 and a lower main plate 18. However, it is contemplated that the main valve 14 may include only one main plate 16, or three or more main plates 16, as desired. In some instances, and as illustrated in FIG. 1, main valve 14 may include a body portion 20 that extends between upper main plate 16 and lower main plate 18, and in some circumstances, may form one or both of upper main plate 16 and lower main plate 18. References to upper and/or lower, or to top and/or bottom, are arbitrary and refer only to the illustrated configurations. It should be understood that gas valve 10 may function correctly regardless of whether it is right-side up, upside down, sideways or any other desired orientation.

In FIG. 1, body portion 20 includes an elongate slot 22. While only a single elongate slot 22 is visible in FIG. 1, in many instances body portion 20 may include a pair or more of elongate slots 22, sometimes equally spaced about body portion 20. The purpose and function of elongate slot 22 will be discussed subsequently.

In the illustrative embodiment, a main shaft 24 extends from body portion 20 and may be used to actuate main valve 14. Main shaft 24 (and hence main valve 14) may be moved in any suitable manner. For example, main shaft 24 may move up and down (in the illustrated orientation) in response to a solenoid, an electric motor, an electromagnetic force, a spring force or any other appropriate movement mechanism as desired.

It is contemplated that main valve 14 may be formed of any suitable material. In some cases, main valve 14 may be formed of metal, plastic, rubber, ceramic or any other material or material combination, as desired. In some embodiments, one or more sealing rings (not shown) may be provided on main valve 14, sometimes using rubber or other suitable material. In some instances, one or more components of main valve 14 may be integrally formed. In some cases, one or more components of main valve 14 may be formed separately and then subsequently secured together via adhesive, welding, bolts, screws, or using any other suitable technique. For example, body portion 20, upper main plate 16 and lower main plate 18 may be integrally formed as a unitary metallic piece. Main shaft 24 may be subsequently attached, or in some instances, may also be integrally formed with body portion 20, upper main plate 16 and lower main plate 18, but this is not required.

In FIG. 1, a control valve 26 is disposed within valve body 12 such that control valve 26 may be considered as being coaxially aligned with main valve 14 in that control valve 26 may be considered as sharing a longitudinal axis with main valve 14. In the illustrative embodiment, control valve 26 includes an upper control plate 28 and a lower control plate 30 that are both disposed on a control shaft 32. Control shaft 32 (and hence control valve 26) may be moved in any suitable manner. For example, control shaft 32 may move up and down (in the illustrated orientation) in response to a solenoid, an electric motor, an electromagnetic force, a spring force or any other appropriate movement mechanism. In some instances, control shaft 32 may move in response to gas pressure and/or gas flow across a connected (not illustrated) diaphragm.

Control valve 26 may be formed of any suitable material. In some cases, control valve 26 may be formed of metal, plastic, rubber, ceramic or any other material or material combination, as desired. In some embodiments, one or more sealing rings (not shown) may be provided on control valve 26, sometimes using rubber or other suitable material. In some instances, upper control plate 28 and/or lower control plate 30 may be formed of a lightweight material such as plastic or a thin layer of metal such as aluminum. By reducing the weight of control valve 26, less energy is needed to move control valve 26 and in some cases finer control of control valve 26 may be achieved.

Lower control plate 30 may either be integrally formed with control shaft 32, or may be separately formed and independently secured to control shaft 32. However, it can be seen in the illustrative embodiment that upper control plate 28 is able to slide relative to body portion 20 of main valve 14. It can be seen that control shaft 32 extends into an interior of main shaft 24. In some instances, upper control plate 28 is secured to control shaft 32 via a peg 34 that is either secured to control shaft 32 or passes through an opening within control shaft 32. Elongate slot 22 within body portion 20 may be configured to accommodate peg 34 by permitting peg 34 (and hence upper control plate 28) to move up and down in response to movement of control shaft 32.

If a single peg 34 is used, peg 34 may be attached to upper control plate 28 via adhesive, welding or any other suitable technique. In some instances, a pair of pegs 34 may be used—one peg 34 above upper control plate 28 (as seen) and one peg 34 (not seen in this view) below upper control plate 28, basically sandwiching upper control plate 28 between upper and lower pegs 34 as will be discussed subsequently with respect to FIG. 4. Peg (or pegs) 34 may be formed of any suitable material, such as a metal, a plastic, a ceramic or some combination thereof. While the illustrative embodiment shows the control shaft 32 extending into an interior of main shaft 24, it is contemplated that in other embodiments, the main shaft 24 may extend into an interior of a control shaft 32, while still achieving a similar overall function.

In some instances, main valve 14 may be considered as providing on-off functionality to valve 10. In some cases, main valve 14 may be movable between an open position (as illustrated in FIG. 1) and a closed position (discussed subsequently with respect to FIG. 3), but in some cases, may not be configured to provide intermediate positions. In some cases, control valve 26 may be considered as providing flow control and/or flow modulation.

Control valve 26 may be movable between an open position (as illustrated) and a closed position (discussed subsequently with respect to FIG. 2), as well as a large or even infinite number of intermediate positions. Thus, control valve 26 may be used to provide fine-tune adjustments of gas flow through gas valve 10.

Gas valve 10 may includes an upper valve seat region 36 and a lower valve seat region 38. In some illustrative embodiments, upper valve seat region 36 may, if desired, include an upper main valve seat 40 and an upper control valve seat 42. Upper main valve seat 40 may be configured to interact with upper main plate 16, while upper control valve seat 42 may be configured to interact with upper control plate 28. In some cases, if desired, upper main valve seat 40 and upper control valve seat 42 may be formed within or on valve body 12, and may be formed of a metallic, plastic, rubber, ceramic or any other suitable material, as desired. In some instances, upper main valve seat 40 and/or upper control valve seat 42 may include a resilient material such as rubber or an elastomeric polymer. In some cases, as will be discussed with respect to FIG. 4, upper main plate 16 may include a suitable resilient material.

During operation, when upper main plate 16 makes significant contact with upper main valve seat 40, gas flow through upper valve seat region 36 may be stopped or at least substantially stopped. Similarly, when upper control plate 28 makes significant contact with upper control valve seat 42, gas flow through upper valve seat region 36 may be stopped or at least substantially stopped. While upper control plate 28 may, if desired, move independently of upper main plate 16, it should be noted that in some instances, movement of upper main plate 16 into a closed or substantially closed position may override the position of upper control plate 28 and may cause upper control plate 28 to also move into a closed position.

Lower valve seat region 38 may, if desired, include an upper main valve seat 44 and an upper control valve seat 46. Lower main valve seat 44 may be configured to interact with lower main plate 18, while lower control valve seat 46 may be configured to interact with lower control plate 30. In some cases, if desired, lower main valve seat 44 and lower control valve seat 46 may be formed within or on valve body 12, and may be formed of a metallic, plastic, rubber and/or ceramic material. In some instances, lower main valve seat 44 and/or lower control valve seat 46 may include a resilient material such as rubber or an elastomeric polymer. In some cases, as will be discussed with respect to FIG. 4, lower main plate 18 may include a suitable resilient material.

When lower main plate 18 makes significant contact with lower main valve seat 44, gas flow through lower valve seat region 38 may be stopped or at least substantially stopped. Similarly, when lower control plate 30 makes significant contact with lower control valve seat 46, gas flow through lower valve seat region 38 may be stopped or at least substantially stopped. While lower control plate 30 may, if desired, move independently of lower main plate 18, it should be noted that in many instances, movement of lower main plate 18 into a closed or substantially closed position may override the position of lower control plate 30 and may cause lower control plate 30 to also move into a closed position.

In some illustrative embodiments, as illustrated, control valve shaft 32 may include a spring 48 that may be configured to bias control valve shaft 32 in one direction or another. In some cases, there may be control advantages to having control valve shaft 32 biased in an upward, or open, position. In some situations, there may be advantages to biasing control valve shaft 32 in a downward, or closed, position. In some cases, spring 48 may be optional. Spring 48, if included, may be a metallic spring or perhaps an elastomeric material that provides a desired biasing effect.

Figure 4:
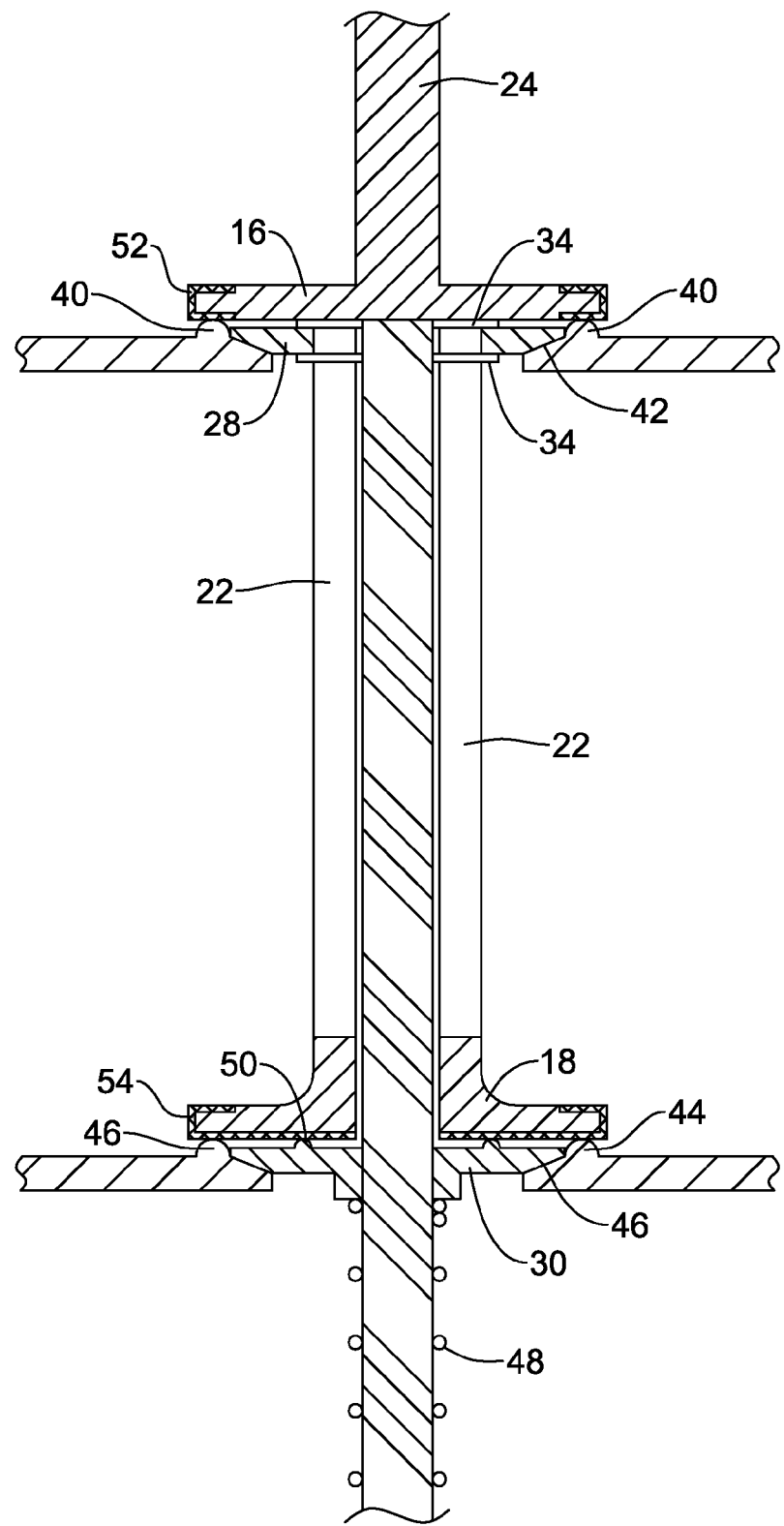
FIG. 4 is a partial cross-sectional view of the gas valve of FIG. 3.

It will be noted that lower control plate 30 may include, as illustrated, a sealing element 50. As best seen in FIG. 4, sealing element 50 may be a raised ring. As discussed above, body portion 20 of main valve 14 may be hollow to accommodate control shaft 32 and thus may permit at least a trivial amount of gas flow through body portion 20. When valve 10 is moved into a closed position by lowering (in the illustrated orientation) main valve 14 and control valve 26, sealing element 50 may contact a lower surface of lower main plate 18, and thereby help prevent gas flow through body portion 20 of main valve 14. In other instances, it is contemplated that a sealing element such as an O-ring may be disposed about control shaft 32 somewhere within body portion 20 to thereby help prevent gas flow through body portion 20 of main valve 14.

Figure 2:
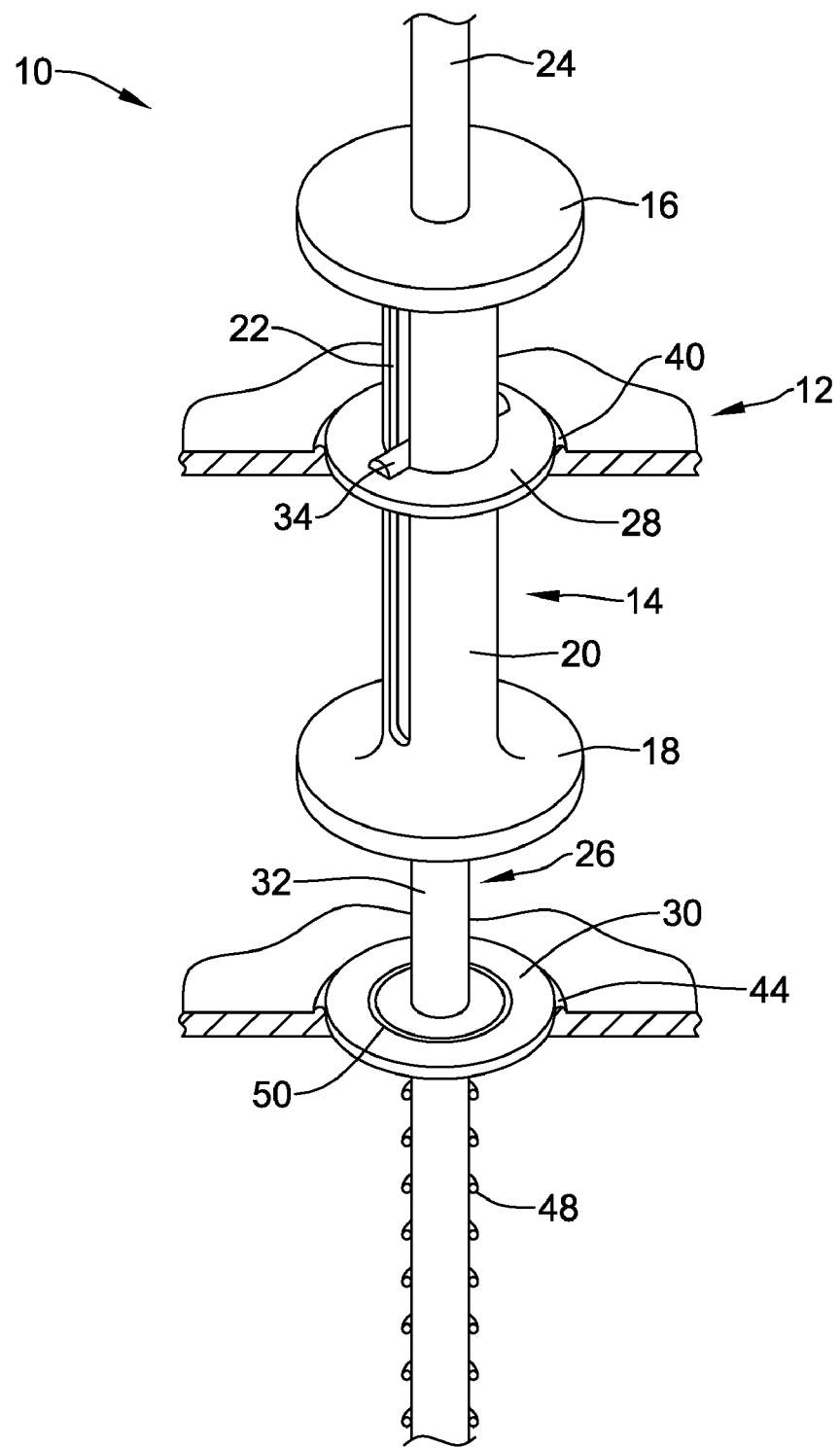
FIG. 2 is a perspective view of a portion of a gas valve in accordance with an illustrative embodiment of the present invention.

In FIG. 2, control valve 26 is illustrated in a closed position while main valve 14 is in an open position. It is contemplated, for example, that when first opening valve 10, main valve 14 may be moved into the open position while control valve 26 remains closed. Thus, initial gas flow may be controlled by opening control valve 26, as control valve 26 may be more easily and more precisely controlled. In some cases, a small initial gas flow may be desired to fuel a pilot light, for example. In other cases, if gas valve 10 is used to regulate gas flow to a heating appliance, a relatively low gas flow may be desired if only a relatively small amount of heat is required.

Figure 3:
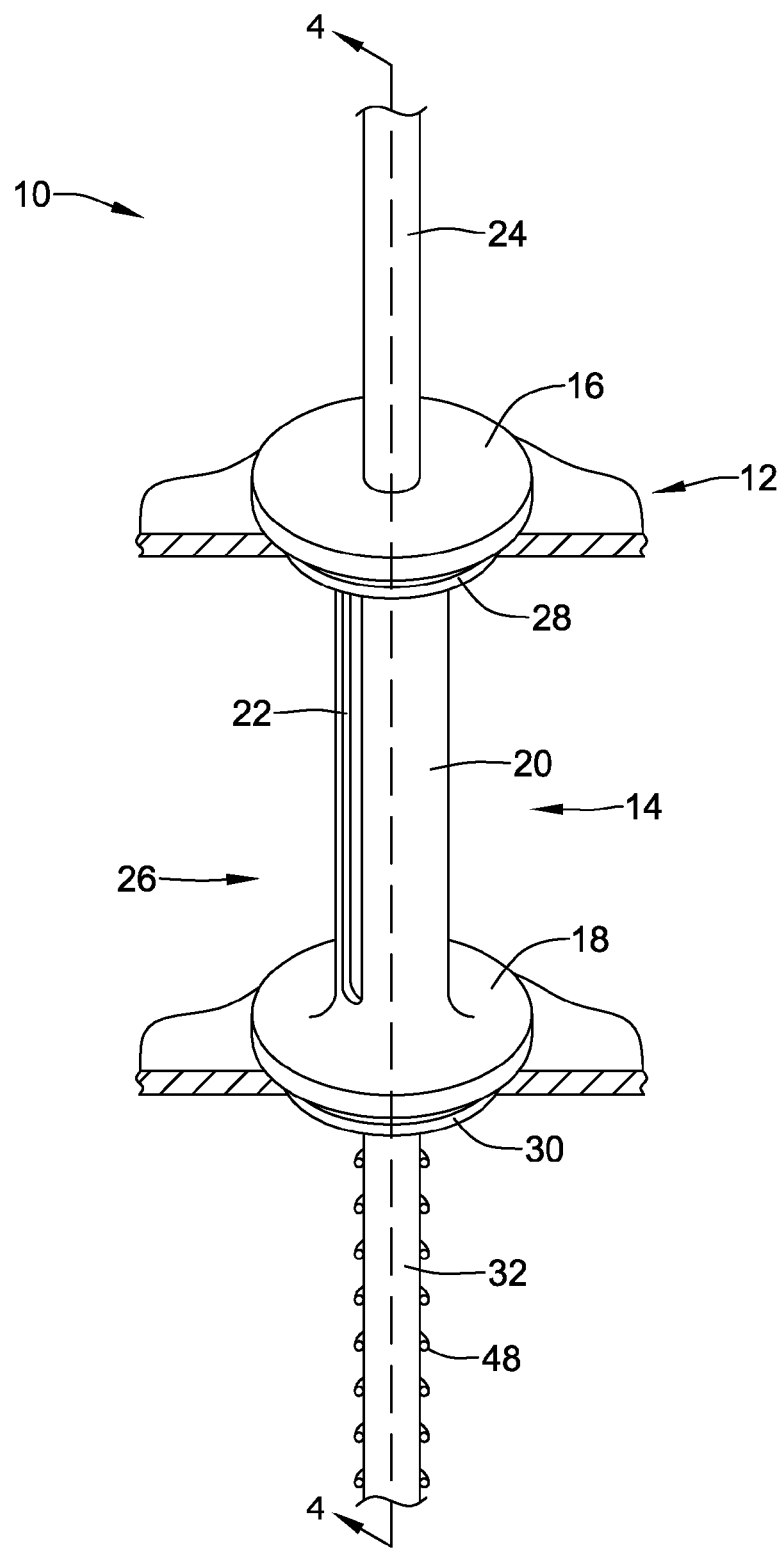
FIG. 3 is a perspective view of a portion of a gas valve in accordance with an illustrative embodiment of the present invention.

In FIG. 3, main valve 14 and control valve 26 are illustrated in closed positions. In some instances, gas valve 10 may be closed by first moving control valve 26 into a closed position, followed by moving main valve 14 into a closed position. In some cases, particularly if a rapid or even emergency closing is necessary or desired, main valve 14 may be moved into the closed position without first closing control valve 26. In some instances, main valve 14 may be configured to override control valve 26. Main valve 14 may, for example, be relatively heavier than control valve 26 and may have a relatively stronger moving mechanism.

In the illustrated Figures, only a small portion of valve body 12 has been shown. It is contemplated that valve body 12 may be configured to accommodate any desired gas flow patterns, based on desired flow characteristics, flow requirements, and the like. In some instances, however, it is contemplated that gas would enter gas valve 10 in the central region disposed between upper valve seat region 36 and lower valve seat region 38. When gas valve 10 is in an open position (as shown for example in FIG. 1), gas would flow upwards through upper valve seat region 36 as well as downwards through lower valve seat region 38, thereby providing a balanced port design. That is, the incoming gas pressure may create relatively equal and opposite forces on the upper valve and lower valve, respectively. This may reduce the forces that are necessary to open and close the valve.

FIG. 4 is a partial cross-sectional view of gas valve 10, illustrating additional elements. As noted above, it can be seen that a pair of pegs 34 may sandwich upper control plate 28. In the illustrated embodiment, upper main plate 16 includes a resilient portion 52 that is positioned to contact upper main valve seat 40. Lower main plate 18 includes a resilient portion 54 that is positioned to contact lower main valve seat 46. Resilient portion 52 and resilient portion 54 may be formed of any suitable material such as rubber or an elastomeric polymer. In some cases, resilient portion 52 and/or resilient portion 54 may be absent, and upper main valve seat 40 and/or lower main valve seat 46 may instead include a resilient material.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A gas valve comprising:
   a valve body defining an upper valve seat region and a lower valve seat region;
   a main valve disposed within the valve body, the main valve comprising an upper main plate and a lower main plate; and
   a control valve coaxially aligned with the main valve, the control valve comprising an upper control plate and a lower control plate;
   wherein the main valve and the control valve are independently actuatable.

2. The gas valve of claim 1, wherein the upper valve seat region is configured to accommodate the upper main plate and the upper control plate and the lower valve seat region is configured to accommodate the lower main plate and the lower control plate.

3. The gas valve of claim 1, wherein the upper valve seat region comprises an upper main valve seat adapted to interact with the upper main plate and an upper control valve seat adapted to interact with the upper control plate.

4. The gas valve of claim 1, wherein the lower valve seat region comprises a lower main valve seat adapted to interact with the lower main plate and a lower control valve seat adapted to interact with the lower control plate.

5. The gas valve of claim 1, wherein the main valve is adapted to override and close the control valve.

6. The gas valve of claim 1, wherein the main valve provides shut-off functionality.

7. The gas valve of claim 1, wherein the control valve provides flow control functionality.

8. A gas valve comprising:
   a valve body defining an upper valve seat region and a lower valve seat region;
   a main valve disposed within the valve body, the main valve comprising an upper main plate, a lower main plate, and a hollow main valve shaft; and
   a control valve coaxially aligned with the main valve, the control valve comprising an upper control plate, a lower control plate, and a control valve shaft slidingly disposed within the hollow main valve shaft.

9. The gas valve of claim 8, wherein the control valve comprises a sealing ring disposed on the lower control plate that interacts with the main valve to stop gas flow through the main valve hollow shaft.

10. A balanced port gas valve comprising:
    a valve body;
    a dual shut-off valve disposed within the valve body comprising a main shaft and a main plunger secured to the main shaft, the main plunger providing first and second main plates adapted to interact with the valve body to permit or stop gas flow; and
    a dual control valve coaxially aligned with the dual shut-off valve comprising a control shaft and first and second control plates secured to the control shaft, the first and second control plates adapted to interact with the valve body to adjust gas flow;
    wherein the main shaft and the control shaft are actuated from opposing directions.

* * * * *